United States Patent [19]

Vettori

[11] Patent Number: 4,773,829
[45] Date of Patent: Sep. 27, 1988

[54] CENTRIFUGAL FAN DRIVEN BY AN ELECTRONIC-COMMUTATION DIRECT-CURRENT MOTOR

[75] Inventor: Claude Vettori, Le Kremlin Bicetre, France

[73] Assignee: Etudes Techniques Et Representations Industrielles E.T.R.I., Neuilly Sur Seine, France

[21] Appl. No.: 91,501

[22] Filed: Aug. 31, 1987

[30] Foreign Application Priority Data

Sep. 10, 1986 [FR] France ................. 86 12655

[51] Int. Cl.⁴ ............................................. F04B 39/06
[52] U.S. Cl. ................................ 417/366; 417/423 R; 310/68 R
[58] Field of Search .......... 417/423 G, 423 H, 423 T, 417/366, 369, 370; 310/68 R, 68 B, 68 D, 46, DIG. 6; 318/254, 254 A

[56] References Cited

U.S. PATENT DOCUMENTS

| | | | |
|---|---|---|---|
| 3,809,935 | 5/1974 | Kristen et al. | 310/68 R |
| 4,315,343 | 2/1982 | Neroda et al. | 15/339 |
| 4,371,313 | 2/1983 | Burgbacher et al. | 415/215 |
| 4,385,276 | 5/1983 | Bitzel | 310/68 R X |
| 4,521,706 | 6/1985 | Kudelski et al. | 310/68 B X |
| 4,558,245 | 12/1985 | Glasaver et al. | 310/68 R X |
| 4,578,605 | 3/1986 | Reinhardt et al. | 318/254 X |
| 4,588,912 | 5/1986 | Shinmura et al. | 310/68 R |
| 4,642,496 | 2/1987 | Kervial et al. | 310/68 B |
| 4,668,898 | 5/1987 | Harms et al. | 310/68 D X |

FOREIGN PATENT DOCUMENTS

| | | |
|---|---|---|
| 0176599 | 4/1986 | European Pat. Off. . |
| 1544989 | 11/1968 | France . |
| 1638272 | 4/1971 | Fed. Rep. of Germany . |
| 1949925 | 4/1971 | Fed. Rep. of Germany . |
| 614077 | 10/1979 | Switzerland . |
| 1345585 | 1/1974 | United Kingdom . |

Primary Examiner—Carlton R. Croyle
Assistant Examiner—Eugene L. Szczecina, Jr.
Attorney, Agent, or Firm—Young & Thompson

[57] ABSTRACT

A centrifugal fan driven by an electronic-commutation d.c. motor is provided with a housing (1) which defines a volute (2), an impeller (4) which is coupled for rotation with the motor shaft (7) being mounted within the fan housing. The motor is placed within a protective casing (13) which also contains at least one printed-circuit board (23) for supporting the motor control circuit (26), the casing being adjacent to the external face (36) of a closure disk (9) of the fan housing (1).

The fan motor casing (13) has an annular extension (14) corresponding to the fan housing (1) and the printed-circuit board (23) is housed within said extension and placed in substantially parallel relation to the fan-housing closure disk (9) in sufficiently close proximity to said disk to be subjected primarily by thermal conduction to the cooling action produced by the fan impeller (4).

9 Claims, 2 Drawing Sheets

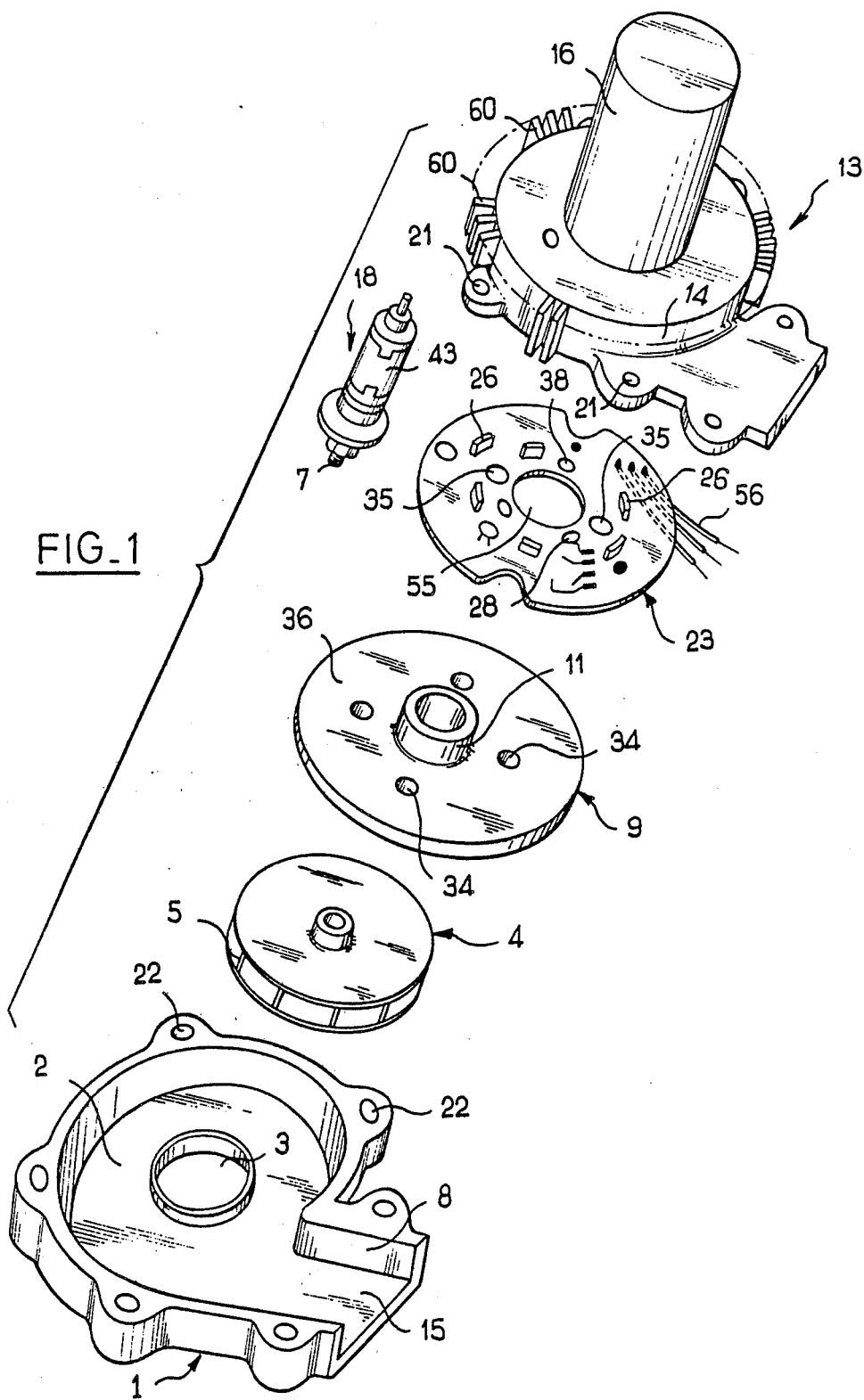
FIG_1

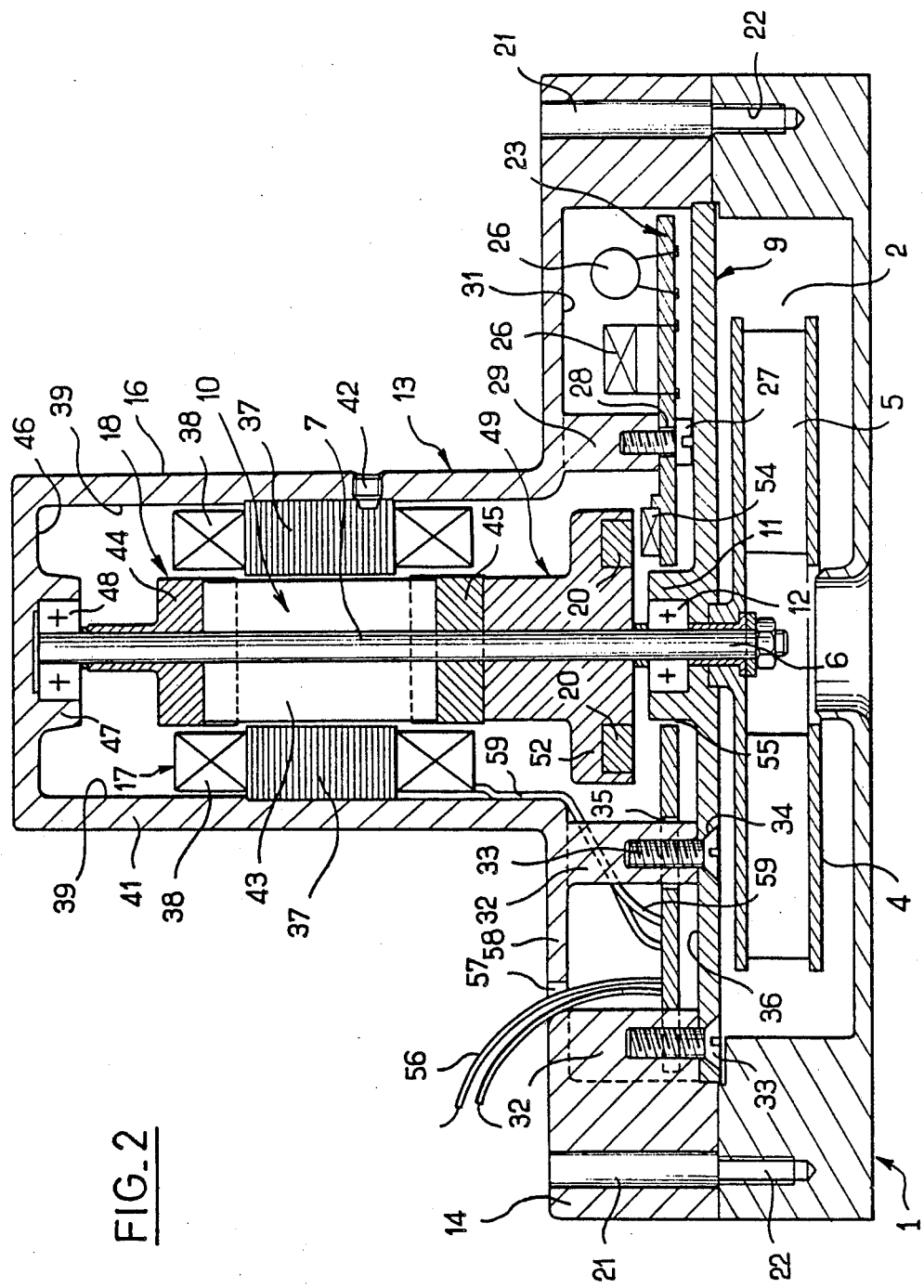
FIG_2

CENTRIFUGAL FAN DRIVEN BY AN ELECTRONIC-COMMUTATION DIRECT-CURRENT MOTOR

BACKGROUND OF THE INVENTION

1. Field of the Invention

The present invention relates to a centrifugal fan driven by a direct-current motor of the electronic commutation type.

2. Description of the Prior Art

Fans of this type usually have a volute or spiral housing which forms an air diffuser. Within said housing is mounted a blade-wheel or impeller which is coupled for rotation with the shaft of an electronic-commutation d.c. motor. The fan housing is provided on one side with a central air inlet and on the other side with a disk for closing the housing, said disk being provided with an opening through which the shaft passes on the side remote from the air inlet. The fan motor is placed within a protective casing which has a generally cylindrical shape and is adjacent to the outer face of the housing closure disk.

Since the motor is of the electronic commutation type, the electronic circuit for controlling the motor has to be included in the above-mentioned protective casing. This electronic control circuit makes it possible in particular to produce commutation or switching of the current direction within the stator windings or permits alternate supply of these windings as a function of the angular position of the rotor which is in turn controlled and supplied by a stationary position sensor. In the majority of instances, this sensor is a magnetic transducer such as a Hall-effect generator and is controlled by the permanent magnet constituting the rotor of the motor.

The presence of these electronic components mounted on a printed-circuit board makes it necessary to increase the dimensions of the protective casing to an appreciable extent or to associate with this latter an auxiliary casing which contains at least part of the electronic components just mentioned. It is also necessary in this case to provide two printed-circuit boards since the aforementioned position sensor must be mounted in the immediate vicinity of the rotor, which complicates the electrical connections and increases the construction cost. In all cases, the result thereby achieved is an increase in overall size of the centrifugal fan. This may prove highly objectionable in applications in which the space available for installation of said fan is limited.

Furthermore, the installation of the electronic components within the casing or in the vicinity of this latter and therefore in proximity to the motor increases the temperature elevation of these components, with the result that it is found necessary to overdimension the space required for this installation in order to ensure suitable ventilation of the control circuit.

British Pat. No. GB-A-1,345,585 describes an electric machine having an electronically-controlled circuit which is placed in the airstream of a tangential fan. The circuit components which are in direct contact with the air flow are liable to be damaged by any foreign bodies carried by this air flow.

U.S. Pat. No. 4,315,343 describes a suction motor having a volute with an axial air intake. This motor is of a conventional brush design and does not present any problem of cooling of electronic components.

One aim of the present invention is thus to propose a centrifugal fan of the aforementioned type which is distinctly more compact than any fans of known types and which also offers highly efficient ventilation of the electronic control circuit of the motor, thereby achieving enhanced reliability and longer service life of the motor.

A further aim of the present invention is to achieve an appreciable improvement in commutation control of the fan motor by placing the magnetic sensor at a greater distance from the motor and providing a sensor control track which is separate and distinct from the rotor magnet of said motor.

SUMMARY OF THE INVENTION

Thus the centrifugal fan contemplated by the invention and driven by an electronic-commutation direct-current motor includes a housing which defines a volute having an axial air intake and in which is mounted a blade-wheel coupled for rotation with the motor shaft. Said motor is placed within a protective casing which also contains at least one printed-circuit board which carries the electronic components of the motor control circuit. Said motor casing is adjacent to the outer face of a fan-housing closure disk which is traversed by the motor shaft on the side remote from the air intake.

A distinctive feature of the fan in accordance with the invention lies in the fact that the fan motor casing has an annular extension corresponding to the fan housing and that the printed-circuit board is housed within said extension and placed in substantially parallel relation to the fan-housing closure disk and in sufficiently close proximity to this latter to be subjected primarily by thermal conduction to the cooling action produced by the fan impeller.

Thus the annular extension can be of relatively small thickness and is capable of accommodating a single printed-circuit board containing all the components of the electronic control circuit. In consequence, the overall size of the fan is not increased to any appreciable extent. At the same time, the electrical connections are simplified and there is no appreciable increase in the cost of construction of a fan of this type.

In an advantageous embodiment of the invention, the printed-circuit board is circular and extends in parallel and contiguous relation to the fan-housing closure disk.

By means of the fan-housing closure disk, the printed-circuit board is continuously cooled by thermal conduction under the action of circulation of air within the volute.

In another advantageous embodiment of the invention, the motor casing is fixed against the fan housing on the side corresponding to the annular extension and the motor shaft extends axially within a tubular portion which projects from said extension on the side remote from the fan housing and which contains the rotor and the stator of the motor.

Preferably, the motor shaft is adapted to carry a member of non-magnetic material having an enlarged portion located substantially in the line of extension of the tubular portion of the fan housing and within the interior of the annular extension, said enlarged portion being adapted to carry an annular magnetic track in oppositely-facing relation to the printed-circuit board.

Thus the magnetic sensor for controlling commutation of the motor is in turn controlled by a magnetic track which is separate and distinct from the permanent magnet of the rotor. In consequence, said sensor does not need to be located near said rotor and can be placed on the same printed-circuit board as the other components of the control circuit of the motor.

BRIEF DESCRIPTION OF THE DRAWINGS

FIG. 1 is an exploded view in perspective showing a centrifugal fan in accordance with the invention.

FIG. 2 is an axial sectional view of said fan.

DESCRIPTION OF THE PREFERRED EMBODIMENTS

The centrifugal fan illustrated in the accompanying drawings is provided with a substantially cylindrical housing 1 which delimits a volute 2 having an axial air inlet 3.

Within the volute 2 is mounted a blade-wheel or impeller 4, the blades 5 of which extend in planes parallel to the axis of the impeller 4. Said impeller is coupled for rotation with the shaft 7 of the fan-driving motor 10 which will be described in detail hereinafter.

Air is discharged from the volute 2 in the radial direction through the outlet 15 formed in one of the lateral walls 8 of the fan housing 1. On the side opposite to the air inlet 3, the fan housing 1 is closed by a disk 9 having a central opening which forms a passageway for the shaft 7. To this end, the disk 9 is provided with a central collar 11 occupied by a bearing 12 in which is rotatably mounted the end 6 of the shaft 7.

In accordance with the invention, the fan-driving motor 10 is placed within a protective casing 13 provided with an annular extension 14 having a radial cross-sectional area which is preferably equal to that of the fan housing 1. Said annular extension 14 is provided with a tubular portion 16 which projects from said extension on the side remote from the fan housing 1 and is coaxial with the shaft 7 of the motor. Said tubular portion 16 contains the stator 17 and the rotor 18 of the motor 10. The motor casing 13 is fixed against the fan housing 1 on the same side as the annular extension 14 by means of screws (not shown in the drawings) engaged within peripheral bores 21 of the extension 14 and in oppositely-facing internally-threaded peripheral bores 22 of the fan housing 1.

Within the annular extension 14 is housed a printed-wiring board 23 for the printed circuit which is associated with the motor 10. The printed-wiring board 23 is so arranged as to be subjected to the cooling action produced by the fan impeller 4. To this end, the circuit board 23 extends in a direction parallel to the disk 9 and at a sufficiently short distance to permit thermal exchanges with said disk. The contour of the circuit board 23 is circular and its diameter is substantially equal to that of the disk 9. The printed-circuit board 23 carries all the electronic components 26 of the motor control circuit and in particular those which permit current commutation within the stator windings of this latter. Since this commutation technique is well known to those versed in the art, these components 26 will not be described in detail.

The printed-circuit board 23 has a central circular opening 55 which is traversed by the central collar 11 of the closure disk 9 of the fan housing 1.

In addition, the above-mentioned circuit board is fixed within the annular extension 14 by means of screws 27 engaged in holes 28 formed in this latter and in columns 29 molded in one piece with the internal face 31 of the extension 14. Additional columns 32 formed in one piece with the internal face 31 of the extension 14 permit attachment of the closure disk 9 by means of screws 33 engaged in bores 34 of this latter. The columns 32 extend through openings 35 formed in the printed-wiring board 23. The circuit assembly is so arranged that the face 36 of the disk 9 which is remote from the volute 2 is in contact with the heads of the fixing screws 27 of the printed-wiring board 23.

The magnetic stator laminations 37 around which are wound the stator windings 38 of the motor 10 are fixed (as shown in FIG. 2) on the internal face 39 of the lateral wall 41 of the tubular portion 16 by means of screws 42, for example. The rotor 18 which is internal with respect to the stator 17 comprises a cylindrical permanent magnet 43 surrounding the motor shaft 7 to which it is rigidly fixed by means of two clamping rings 44, 45. The end-wall 46 of the tubular portion 16 is provided with a projecting central cup 47 in which is housed a second bearing 48 for the motor shaft 7.

Within the extension of the tubular portion 16 and within the annular extension 14, the shaft 7 is adapted to carry a cylindrical member 49 of non-magnetic material. Said cylindrical member is fixed on said shaft and has an enlarged portion 52 which is housed within the extension 14 and is adapted to carry an annular magnetic track 20 located in oppositely-facing relation to the printed-wiring board 23. Said annular magnetic track has a succession of alternate north-south polarities (not visible in the figures) corresponding to those of the permanent magnet 43 of the rotor 18.

The magnetic track 20 is adapted to cooperate in known manner with a magnetic sensor 54 such as, for example, a Hall-effect generator which is soldered on the printed-circuit board 23 and detects any transition from a north polarity to a south polarity in order to initiate current commutation within the stator windings 38.

The fact that the sensor 54 is controlled by a magnetic track 20 which is separate from the rotor magnet gives rise to a number of essential advantages. It is thus possible in the first place to position the sensor 54 on the same printed-circuit board 23 as the other components of the control circuit of the motor 10, with the result that another circuit board is not necessary for supporting this component, thus reducing the bulk of the fan and simplifying the electrical connections. Furthermore, the track 20 has a larger diameter than that of the magnet 43 of the rotor 18, thereby enhancing the accuracy of detection of polarities and increasing the distance from the sensor 54 to the stator windings 38, thus protecting the sensor against the influence of parasites generated by these windings. Thus, while increasing the compactness of the fan, the operating characteristics of its drive motor are improved.

Electric power is supplied to the motor by means of conductors 56 which pass through an opening 57 formed in the wall 58 of the annular extension 14 and are soldered to the printed-circuit board 23 from which connections are made with the stator windings 38 by means of the conductors 59.

Thus the presence of the annular extension 14 makes it possible to give the printed-circuit board 23 a diameter equal to that of the closure disk 9 of the fan housing 1. This diameter is sufficient to house all the components 26 of the circuit without entailing any need to provide an additional casing irrespective of the power and therefore the dimensions of the fan.

In consequence, the bulk of the casing is substantially limited to that of the motor which is protected by said casing, with the result that the fan thus obtained is as compact as possible.

During operation, heating of the electronic control circuit of the motor 10 which is mounted on the printed-circuit board 23 arises both from the operation of its power components (commutation components) and heating of the motor. The circulation of air produced within the volute 2 by rotation of the impeller 4 has the effect of cooling the disk 9. The printed-circuit board 23 which is contiguous to the disk 9 is thus continuously cooled by radiation effect. The fixing screws 27 of the circuit board 23 which are in contact with the disk 9 and the columns 32 which serve to secure the disk 9 and extend through said circuit board 23 also promote cooling of this latter by thermal conduction.

As will be readily apparent, the invention is not limited to the example hereinabove described and many alternative forms of construction may accordingly be contemplated without thereby departing either from the scope or the spirit of this invention.

Thus it follows that the disk 9 could be pierced by louvers in order to achieve an even greater improvement in cooling of the printed-circuit board by a forced convection effect. Similarly, it would be possible to provide fins on the enlarged portion 52 of the cylindrical member in order to permit forced convection on the other face of the circuit board.

With the same objective, cooling fins 60 could be provided on the outer lateral wall 60 of the extension 14.

It would also be possible to employ the magnet 43 of the rotor 18 for controlling the sensor 54.

What I claim is:

1. A centrifugal fan driven by an electronic-commutation direct-current motor having a control circuit and an output shaft (7), the fan having a fan housing (1) which defines a volute (2) having an axial air intake (3) and in which is mounted a blade-wheel (4) coupled for rotation with the motor shaft (7), said motor being disposed within a protective casing (13) which is secured to the fan housing by the means of an annular extension (14) of said casing (13), said annular extension (14) having substantially the same radial dimensions as said fan housing (1), a closure disk (9) which is traversed by the motor shaft (7) and which separates the interior of the annular extension from the interior of the fan housing, said annular extension (14) comprising within its interior a single printed-circuit board (23) in substantially parallel relation to the closure disk (9), the surface of said single printed-circuit board (23) supporting all the electronic components (26) of the control circuit of the motor (10).

2. A centrifugal fan according to claim 1, wherein the casing (13) of the motor (10) is fixed against the fan housing (1) on the side corresponding to the annular extension (14) and wherein the motor shaft (7) extends axially within a tubular portion (16) which projects from said annular extension (14) on the side remote from the fan housing (1).

3. A centrifugal fan according to claim 2, wherein the shaft (7) of the motor (10) is adapted to carry a member (49) of non-magnetic material having an enlarged portion (52) located substantially in the line of extension of the tubular portion (16) of the motor casing (13) and within the interior of the annular extension (14), said enlarged portion (52) being adapted to carry an annular magnetic track (20) in oppositely-facing relation to the printed-circuit board (23).

4. A centrifugal fan according to claim 3, wherein the printed-circuit board (23) is adapted to carry opposite to the annular magnetic track (20) a magnetic sensor (54) which cooperates with said magnetic track so as to control the commutation of the motor.

5. A centrifugual fan according to claim 1, wherein the printed-circuit board (23) is fixed against columns (29) which are joined to the internal face (31) of the annular extension (14), the closure disk (9) of the fan housing (1) being in turn fixed against other columns which are integral with the aforesaid internal face (31).

6. A centrifugal fan according to claim 2, wherein the motor shaft (7) is rotatably mounted in two bearings (12, 48) in which one bearing (12) is carried by the closure disk (9) of the fan housing which passes through an opening (55) of the printed-circuit board (23) whilst the other bearing (48) is carried by the end-wall (46) of the tubular portion (16) at the end remote from the annular extension (14).

7. A centrifugal fan according to claim 2, wherein the stator (17) is fixed against the internal face (39) of the tubular portion and wherein the rotor (18) has a cylindrical permanent magnet (43) extending opposite to the stator (17) around the shaft (7) to which said magnet is rigidly fixed by means of clamping rings (44, 45).

8. A centrifugal fan according to claim 1, wherein the external lateral wall of the annular extension (14) is provided with cooling fins (60).

9. A centrifugal fan according to claim 1, wherein the printed circuit board (23) is circular and has a diameter substantially equal to that of the closure disk (9) of the fan housing (1).

* * * * *